(12) United States Patent
Morinaga et al.

(10) Patent No.: US 7,948,892 B2
(45) Date of Patent: May 24, 2011

(54) RELAY METHOD, RELAY DEVICE, COMMUNICATION SYSTEM, AND COMPUTER PROGRAM

(75) Inventors: Masanobu Morinaga, Kawasaki (JP); Hideaki Miyazaki, Kawasaki (JP); Noriyuki Fukuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 822 days.

(21) Appl. No.: 11/826,460

(22) Filed: Jul. 16, 2007

(65) Prior Publication Data

US 2007/0263597 A1 Nov. 15, 2007

Related U.S. Application Data (63) Continuation of application No. PCT/JP2005/000411, filed on Jan. 14, 2005.

(51) Int. Cl.
*H04L 12/26* (2006.01)
(52) U.S. Cl. ......................................... 370/235; 370/231
(58) Field of Classification Search .......... 370/230–238, 370/400–410
See application file for complete search history.

(56) References Cited

U.S. PATENT DOCUMENTS

| | | | |
|---|---|---|---|
| 5,818,815 | A | 10/1998 | Carpentier et al. |
| 5,875,173 | A * | 2/1999 | Ohgane et al. ................ 370/230 |
| 6,215,767 | B1 | 4/2001 | Li |
| 6,563,796 | B1 | 5/2003 | Saito |
| 6,847,613 | B2 * | 1/2005 | Mimura et al. ............... 370/235 |
| 6,965,597 | B1 * | 11/2005 | Conway ........................ 370/389 |
| 7,221,656 | B1 * | 5/2007 | Aweya et al. ................. 370/252 |
| 7,274,663 | B2 * | 9/2007 | Silverman ..................... 370/230 |
| 2002/0085498 | A1 * | 7/2002 | Nakamichi et al. ........... 370/236 |
| 2002/0145982 | A1 * | 10/2002 | Talpade et al. ................ 370/253 |
| 2004/0071084 | A1 * | 4/2004 | El-Hennawey et al. ...... 370/230 |
| 2007/0195698 | A1 * | 8/2007 | Briscoe et al. ................ 370/235 |

FOREIGN PATENT DOCUMENTS

| | | |
|---|---|---|
| JP | 0 702 472 A1 | 3/1996 |
| JP | 8-97832 | 4/1996 |
| JP | 9-62601 | 3/1997 |
| JP | 2997607 | 10/1999 |
| JP | 2001-251302 | 9/2001 |
| JP | 3443531 | 6/2003 |
| JP | 2003-324479 | 11/2003 |
| JP | 2006-13969 | 1/2006 |
| WO | 2004/010670 A1 | 1/2004 |
| WO | 2006/070471 A1 | 7/2006 |

OTHER PUBLICATIONS

International Serarch Report for PCT/JP2005/000411 mailed Apr. 26, 2005. Gijiko Kokan Hinshitsu Sokutei Kino o Tosai shita Test System, Abacus Advanced bulk Call Simulator, Business Communication 2001, vol. 38, No. 7, Jul. 2001, pp. 76-77.
Supplementary European Search Report for Application No. 05703650.1-1249; dated Aug. 28, 2009.

* cited by examiner

*Primary Examiner* — Thai D Hoang
(74) *Attorney, Agent, or Firm* — Staas & Halsey LLP (57) ABSTRACT

The present invention enables accurate simulation of the state of communication over a communication network in which a communication channel of different communication characteristic is set for each protocol and session, such as a VoIP network built in a multi-vendor environment, and evaluation of communication quality of communications between IP phones, etc. over a supposed communication network. A relay device for relaying packet communications between a plurality of communication devices is used, and the relay device sets a virtual processing unit as an initial process so that it corresponds to the packet transmission direction and/or attribute, based on the contents of a received packet specified by a control protocol, and relays communications of packets after the initial process, based on the packet loss rate and delay time distribution indicated by communication state information associated with the processing unit.

18 Claims, 9 Drawing Sheets

| ITEM | SUPPLEMENTARY ITEM | SET VALUE |
|---|---|---|
| LOSS RATE | — | 1.1% |
| FIXED DELAY | — | 52ms |
| VARYING DELAY | NOT SMALLER THAN 0ms BUT SMALLER THAN 30ms | 61% |
| | NOT SMALLER THAN 30ms BUT SMALLER THAN 60ms | 14% |
| | NOT SMALLER THAN 60ms BUT SMALLER THAN 90ms | 7% |
| | EQUAL TO OR GREATER THAN 90ms | 8% |
| CODEC | CODEC CONVERSION 1 | G.711 |
| | CODEC CONVERSION 2 | G.729 |
| | ⋮ | |
| | CODEC CONVERSION n | |

FIG. 4

| INDEX | RECEPTION PORT | IP ADDRESS | ASSIGNED DEVICE | PHONE NUMBER |
|---|---|---|---|---|
| 1 | 5060 | 10.254.212.22 | VIRTUAL DEVICE 1 | 7777-1234 |
| 2 | 5061 | 10.254.214.44 | VIRTUAL DEVICE 4 | 7777-9876 |
| 3 | 5062 | 10.254.255.55 | VIRTUAL DEVICE 3 | 7888-1111 |
| 4 | 5063 | 10.254.217.77 | VIRTUAL DEVICE 2 | 7111-1111 |
| ... | ... | ... | ... | ... |

| INDEX | SCHEDULED TRANSMISSION TIME (hh:mm:ss.ms) | IP ADDRESS AND PORT NUMBER | PACKET DATA |
|---|---|---|---|
| 1 | 10:00:00.000 | 10.254.214.3:6020 | RTP DATA 1 |
| 2 | 10:00:00.020 | 10.254.214.3:6020 | RTP DATA 2 |
| 3 | 10:00:00.041 | 10.254.214.3:6020 | RTP DATA 3 |
| 4 | 10:00:00.065 | 10.254.214.3:6020 | RTP DATA 4 |
| ⋮ | ⋮ | ⋮ | ⋮ |

RELAY METHOD, RELAY DEVICE, COMMUNICATION SYSTEM, AND COMPUTER PROGRAM

The present application is a continuation of PCT International Application No. PCT/JP2005/000411 which has an International filing date of Jan. 14, 2005 and designated the United States of America.

TECHNICAL FIELD

The present invention relates to a relay method for relaying packet communications between a plurality of communication devices; a relay device adopting the relay method; a communication system comprising the relay device; and a computer program for realizing the relay device, and more particularly relates to a relay method, a relay device, a communication system and a computer program for use in simulating the communication state of real-time communications such as IP telephony.

BACKGROUND ART

In recent years, there is an increasing use of real-time applications including streaming distribution, such as VoIP (Voice over Internet Protocol) and VoPN (Voice over Packet Network), which perform transmission and reception of audio and image data between devices over a communication network such as an IP network. When a real-time application is used, the reproduction quality in reproducing audio and video data received on the application is influenced by the state of the IP network. Therefore, a guideline determined by the Ministry of Internal Affairs and Communications defines that providers of IP phone services should maintain certain communication quality for their services.

However, since a VoIP network including a plurality of communication networks such as an IP network and a public network, which provides IP phone services, is generally built in a multi-vendor environment, it is difficult to secure and evaluate the transmission quality over the VoIP network. It is therefore necessary to provide an evaluation method for predicting communication quality between communicating terminal devices making a call, namely end-to-end communication quality, by simulating the characteristics of the communication network representing the communication state over the VoIP network, and actually making a call between the terminal devices. A method for simulating the communication state to evaluate the quality of such communications is disclosed, for example, in Japanese Patent No. 2997607.

DISCLOSURE OF THE INVENTION

However, in the VoIP network, although signaling transmitted by a protocol such as SIP (Session Initiation Protocol) and media such as video data and audio data transmitted by a protocol such as RTP (Real-time Transport Protocol) pass through different communication channels according to the types and there is often a difference in the characteristics between the up-direction and down-direction communication channels, a conventional method performs the process relating to the reproduction of the communication state under a single condition, and therefore there is a problem that it is difficult to accurately reproduce and evaluate the state of communication using a different communication channel for each session, such as signaling and media type.

Moreover, there is a problem that, although conversion such as encoding and decoding is performed for the communication of audio data over the VoIP network, the influence of the conversion on the communication quality is not taken into consideration.

The present invention has been made to solve the above problems, and it is a main object of the invention to provide a relay method capable of accurately reproducing and evaluating the communication state by setting a processing unit for executing processes related to the reproduction of the communication state of packets required for communication in association with the transmission direction and/or attribute of a packet; a relay device adopting the relay method; a communication system comprising the relay device; and a computer program for realizing the relay device.

It is another object of the invention to provide a relay device capable of accurately reproducing the communication state by further performing encoding and decoding processes in the processing units.

A relay method according to a first aspect is a relay method for transmitting a packet received from one communication device to another communication device, characterized by comprising the steps of: setting a virtual processing unit corresponding to a packet transmission direction and/or attribute; deriving a transmission time of a received packet based on prerecorded communication state information indicating a communication state, by the processing unit; and transmitting the packet based on the derived time, by the processing unit.

In the relay method of the present invention, since different processing units are used according to the transmission directions and/or attributes, it is possible to accurately simulate and evaluate the communication state over a communication network in which a communication channel of different communication characteristics is set for each session, such as a VoIP network built in a multi-vendor environment.

A relay device according to a second aspect is a relay device for transmitting a packet received from one communication device to another communication device, characterized by comprising a processing unit corresponding to a packet transmission direction and/or attribute, for deriving a transmission time of a packet based on prerecorded communication state information indicating a communication state, and transmitting the packet based on the derived time.

In the relay device of the present invention, since different processing units are used according to the transmission directions and/or attributes, it is possible to accurately simulate and evaluate the communication state over a communication network in which a communication channel of different communication characteristic is set for each session, such as a VoIP network built in a multi-vendor environment.

A relay device according to a third aspect is a relay device for transmitting a packet received from one communication device to another communication device, characterized by comprising setting means for setting a virtual processing unit corresponding to a packet transmission direction, wherein said processing unit derives a transmission time of a packet based on prerecorded communication state information indicating a communication state and transmits the packet based on the derived time.

In the relay device of the present invention, since a virtual processing unit is set for each transmission direction, it is possible to accurately simulate and evaluate the communication state over a communication network in which a communication channel of different communication characteristic is set for each session, such as a VoIP network.

A relay device according to a fourth aspect is based on the third aspect, and characterized in that the communication state information contains information showing a packet loss rate and a delay time distribution, and the processing unit comprises: means for discarding a packet based on the loss rate contained in the communication state information; and means for accumulating a packet based on a delay time contained in the communication state information.

With the relay device according to the present invention, it is possible to simulate the communication state of a communication network based on the packet loss rate and the delay time distribution.

A relay device according to a fifth aspect is based on the third aspect or the fourth aspect, and characterized in that the communication state information is recorded in association with the processing unit.

With the relay device according to the present invention, since it is possible to simulate a different communication state for each communication channel by executing processes, such as discarding and accumulation of packets, based on the communication state information associated with the processing unit, and thus it is possible to accurately simulate communication over a communication network in which a communication channel is set for each session.

A relay device according to a sixth aspect is based on any one of the third aspect through the fifth aspect, and characterized in that the packet is a control packet specified by a control protocol, and said setting means sets a virtual signaling processing unit for processing the control packet, in the processing unit.

With the relay device according to the present invention, it is possible to simulate the communication state for each protocol such as SIP that is a control signaling protocol by setting a signaling processing unit by an initial process (INVITE process) for setting up a call based on the contents of a received packet specified by a control protocol.

A relay device according to a seventh aspect is based on any one of the third aspect through the sixth aspect, and characterized in that the packet is a streaming communication packet specified by a streaming protocol, and said setting means sets a virtual media processing unit for processing the streaming communication packet, in the processing unit.

With the relay device according to the present invention, since a media processing unit is set for each session including a type of audio, video, etc. specified by a streaming protocol such as RTP (Real-time Transport Protocol), it is possible to accurately simulate the communication state over a communication network in which a communication channel is set for each session, and suitably set a processing unit according to communication to be simulated, such as voice communication, and communication including video to be used as a television phone.

A relay device according to an eighth aspect is based on the third through the seventh aspect, and characterized by further comprising means for setting a plurality of logical communication ports corresponding to a plurality of logical communication channels, respectively, through a single physical communication line, and characterized in that the communication channels correspond to the plurality of processing units, respectively.

With the relay device according to the present invention, since a plurality of logical communication ports are set using single communication means such as a network card as hardware, it is possible to set a plurality of virtual communication channels by single hardware, and therefore it is possible to realize communication channels in an up-direction and down-direction and simulate the communication state related to a plurality of communication channels which pass a plurality of communications, with a limited hardware structure.

A relay device according to a ninth aspect is based on any one of the third aspect through the eighth aspect, and characterized in that the processing unit further comprises encoding and decoding means for encoding and decoding data contained in a received packet.

With the relay device according to the present invention, by reproducing the process of encoding and decoding audio data which is performed in communicating audio data over a communication network by a CODEC (Coder-Decoder), it is possible to accurately simulate an actual communication state.

The relay device according to a tenth aspect is based on the ninth aspect, and characterized in that the encoding and decoding means is constructed to perform a plurality of times of encoding and decoding whose processing methods are respectively defined.

With the relay device according to the present invention, since it is possible to reproduce communications through a plurality of communication networks in which different CODEC processes are performed, it is possible to accurately simulate an actual communication state. In particular, even when the communication networks include not only an IP network, but also a circuit switching network, it is possible to simulate the communication state reflecting the difference in the encoding and decoding methods between the respective communication networks.

A communication system according to an eleventh aspect is characterized by comprising: a relay device defined in any one of the second aspect through the tenth aspect; and a plurality of communication devices for communicating with each another through the relay device.

In the communication system according to the present invention, it is possible to accurately simulate and evaluate the communication state over a communication network in which a communication channel of different communication characteristic is set for each session, such as a VoIP network.

A computer program according to a twelfth aspect is a computer program for causing a computer comprising means for communicating with a plurality of devices to transmit a packet received from one device to another device, characterized in that said computer program causes the computer to set a virtual processing unit, which derives a transmission time of a packet based on prerecorded communication state information indicating a communication state and transmits the packet based on the derived time, in association with a packet transmission direction and/or attribute.

By executing the computer program according to the present invention with a computer such as a communication computer, the computer acts as a relay device for relaying communications to simulate the communication state, and it is possible to accurately simulate and evaluate the state of communication over a communication network in which a communication channel of different communication characteristic is set for each session, such as a VoIP network.

According to the relay method, relay device, communication system and computer program of the present invention, a relay device for relaying packet communications between a plurality of communication devices is used, and the relay device sets a virtual processing unit based on the contents of a received packet specified by a control protocol as an initial process so that it corresponds to the packet transmission direction and/or attribute, and relays communications of packets after the initial process, based on the packet loss rate and the delay time distribution indicated by the communication state information associated with the processing unit.

In this structure, it is possible to accurately simulate the communication state over a communication network in which a communication channel of different communication characteristic is set for each protocol and session, such as a VoIP network built in a multi-vendor environment, and thus it is possible to provide advantageous effects, such as accurate evaluation of communication quality of communication of IP phones, etc. over a supposed communication network.

Moreover, in the relay device and so on of the present invention, since it is possible to reproduce communications over a plurality of communication networks in which different CODEC processes are executed by performing a plurality of times of encoding and decoding whose processing methods are respectively defined on data contained in the received packets, it is possible to provide advantageous effects, such as accurate simulation of an actual communication state.

Further, by setting a plurality of logical communication ports corresponding to a plurality of logical communication channels, respectively, by using single communication means such as a network card that is hardware to which single physical communication line is connected, it is possible to set a plurality of virtual communication channels by single hardware, and thus it is possible to provide advantageous effect, such as realizing communication channels in the up-direction and down-direction, and further a simulation of the communication state related to a plurality of communication channels which pass a plurality of communications, with a limited hardware structure.

DETAILED DESCRIPTION OF THE INVENTION

The following description will explain the present invention in detail with reference to the drawings illustrating an embodiment thereof. In a communication quality evaluation system of the present invention, first, the characteristics of a communication network representing the state of end-to-end communication, such as packet delay, loss rate and jitter between terminal devices, over an existing communication network, such as a VoIP network, are measured using, for example, a communication characteristic measurement method disclosed in Japanese Patent No. 2004-188922 filed by the applicant of the present application. Then, based on the measurement results, a communication state over the existing communication network or a newly designed communication network is simulated as a pseudo network to be used for an IP telephony network, for example. Communication quality is evaluated using a method such as a Mean Opinion Score by asking subjects to sense simulated IP phone calls. Note that it may be possible to evaluate the communication quality by other methods, such as a method using an existing measurement device.

Figure 1:
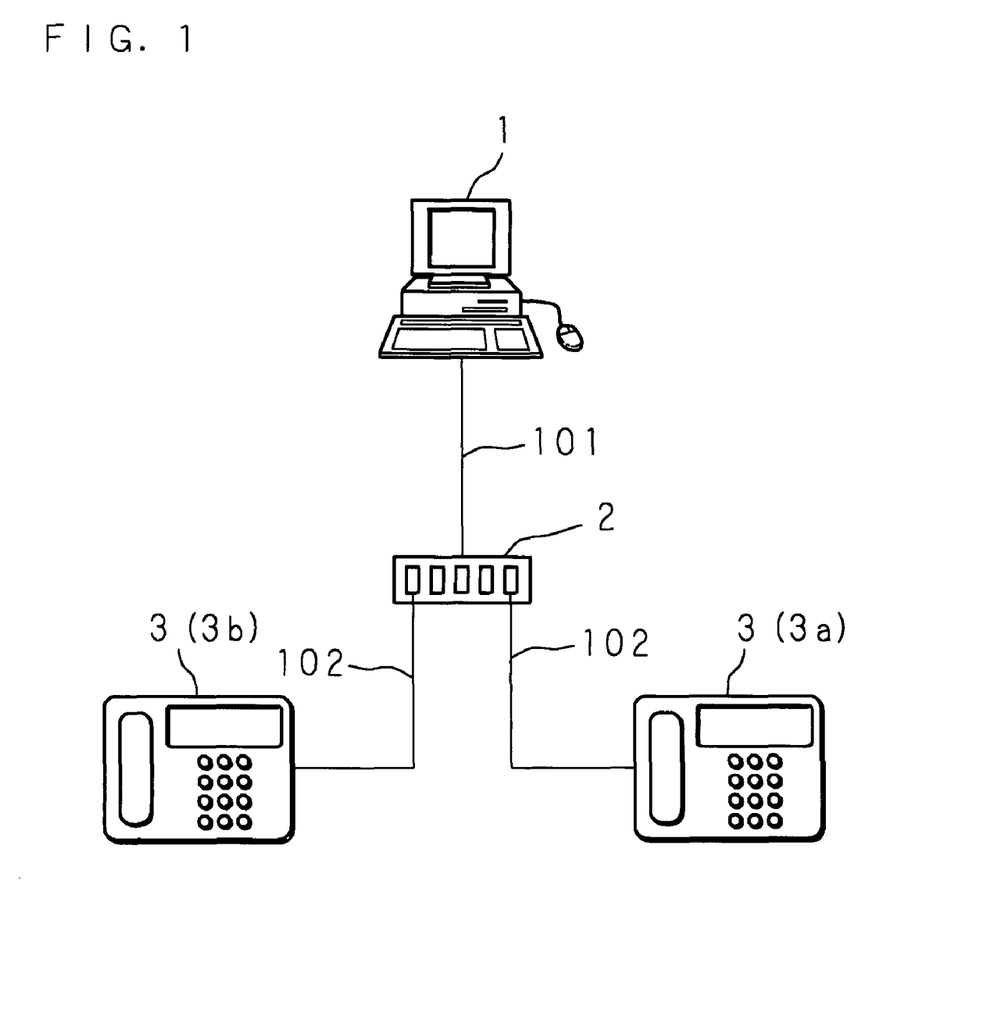
FIG. 1 is a conceptual view showing an example of a communication system of the present invention.

FIG. 1 is a conceptual view showing an example of a communication system of the present invention. In FIG. 1, 1 represents a relay device of the present invention using a communication computer, and, when simulating the state of communication to evaluate communication quality, the relay device 1 performs various processes to reproduce delay of the packets over a communication network to be evaluated, such as the derivation of transmission times of packets and the transmission of packets based on the derived transmission times. A connection device 2, such as a repeater hub and a switching hub, is connected to the relay device 1 through a first communication line 101, and two communication devices 3 and 3 using IP phones are connected to the connection device 2 through second communication lines 102 and 102 used as a pseudo network. If it is necessary to particularly distinguish the respective communication devices 3 and 3, they are distinguished from each other by indicating the communication device 3 on the sending end as a first communication device 3a, and the communication device 3 on the receiving end as a second communication device 3b.

Figure 2:
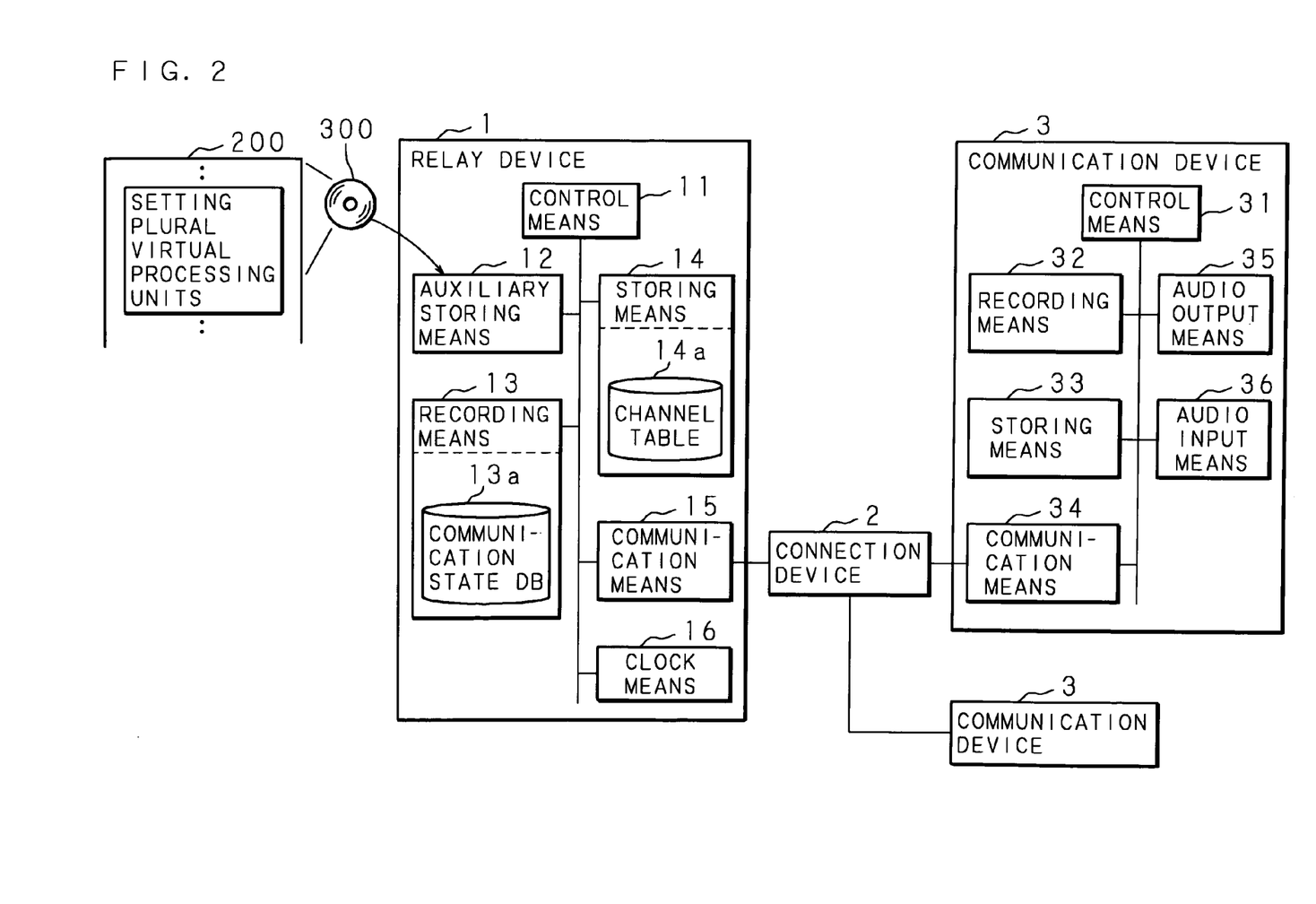
FIG. 2 is a block diagram showing a structural example of various devices included in the communication system of the present invention.

FIG. 2 is a block diagram showing a structural example of various devices included in the communication system of the present invention. The relay device 1 comprises control means 11 (first setting unit, second setting unit) such as a CPU for controlling the entire device; auxiliary storing means 12 such as a CD-ROM drive for reading various kinds of information from a recording medium 300 such as a CD-ROM on which various kinds of information such as a computer program 200 of the present invention and data are recorded; and recording means 13 such as a hard disk for recording various kinds of information read by the auxiliary storing means 12. The computer acts as the relay device 1 of the present invention by reading various kinds of information such as the computer program 200 of the present invention and data from the recording means 13, storing them on storing means 14 such as a RANI for temporarily storing information, and executing various processing steps included in the computer program 200. Moreover, the relay device 1 comprises communication means 15 such as a network card for communicating with the connection device 2, and clock means 16 for indicating the time. Note that a part of the recording area of the recording means 13 is used as a communication state database (communication state DB) 13a for recording communication state information indicating the state of communication, such as the distribution of delay times of packets. It may be possible to use a part of the recording area of other device connected to the relay device 1 as the communication state database 13a instead of using a part of the recording area of the recording means 13 as the communication state database 13a. Stored in a part of the storage area of the storing means 14 is information such as a channel table 14a storing information related to communication channels. Note that although the relay device 1 of the present invention shown in FIGS. 1 and 2 is connected to the connection device 2 through a single first communication line 101 from one communication means 15 and connected to two communication devices 3 and 3 through the connection device 2, it may be possible to provide two communication means 15 and 15 corresponding to the communication devices 3 and 3, respectively, and connect the relay device 1 directly to the communication devices 3 and 3 without using the connection device 2.

The communication device 3 comprises control means 31; recording means 32; storing means 33, communication means 34; audio output means 35 for converting audio data received as a digital signal into an analog signal and outputting it as voice; and audio input means 36 for converting an analog signal inputted as voice into audio data in the form of a digital signal. Note that it may be possible to use a general IP phone terminal device as the communication device 3. The communication terminal device 3 may be in any form if it is a device having an IP phone function.

Figure 3:
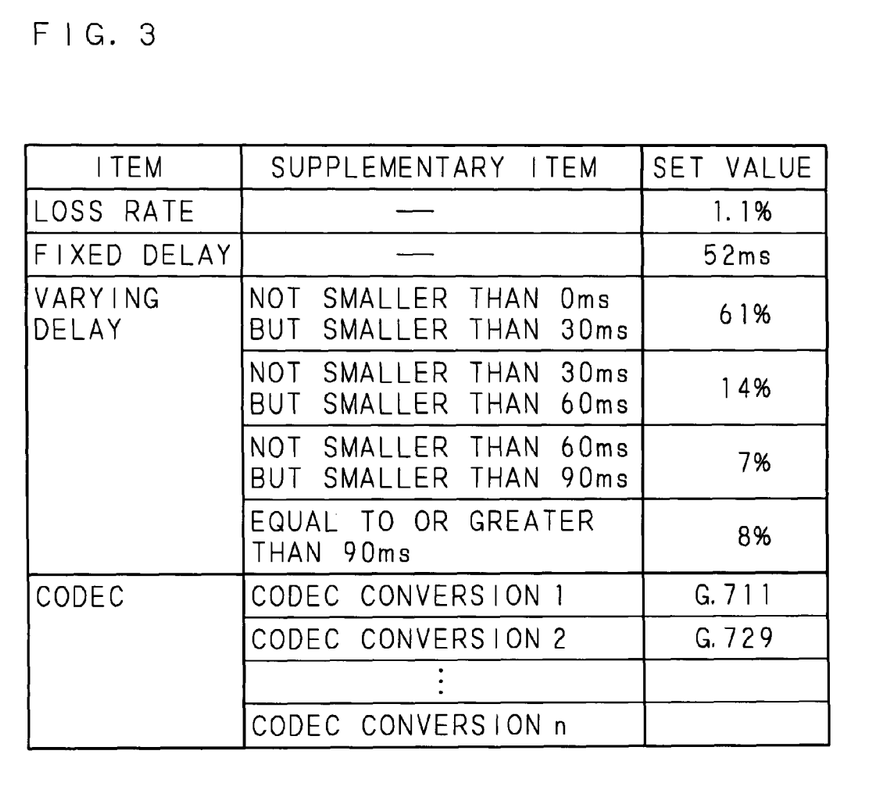
FIG. 3 is a table conceptually showing one example of recorded contents in a communication state database included in a relay device of the present invention.

FIG. 3 is a table conceptually showing an example of recorded contents in the communication state database 13a included in the relay device 1 of the present invention. In the communication state database 13a, the delay time distribution and CODEC are recorded as the communication state information indicating the communication state corresponding to the transmission direction and attributes of packets. The delay time distribution is indicated by items such as the packet loss rate, fixed delay, varying delay, and set values which are data related to these items. The delay time of varying delay recorded in the communication state database 13a is a delay time indicating the difference between an expected arrival time and an actual arrival time of a packet transmitted over a VoIP network to be simulated. The loss rate indicates by percentage the ratio of packets which were lost before arriving at their destination. In the example shown in FIG. 3, the loss rate is 1.1%. The fixed delay is a constant delay caused mainly by the communication network structure, such as the physical distance of the communication network, and the number of devices. If only the varying delay is taken into consideration, the numerical value indicating the fixed delay may be unnecessary. The varying delay is the values showing the distribution of delay times of transmitted packets by associating classified delay times shown as a supplementary item with the occurrence rate of the delay times. In the example shown in FIG. 3, the delay time is classified every 30 ms, and a numerical value of 61% is associated as the set value for the class of varying delay of not smaller than 0 ms but smaller than 30 ms. This means that the provability of occurrence of varying delay of not smaller than 0 ms but smaller than 30 ms is 61%. Similarly, the provability of occurrence of varying delay of not smaller than 30 ms but smaller than 60 ms is 14%, the provability of occurrence of varying delay of not smaller than 60 ms but smaller than 90 ms is 7%, and the provability of occurrence of varying delay equal to or greater than 90 ms is 8%. Note that the rate of occurrence of delay time indicates, by percentage, the ratio of delayed packets to the arrived packets excluding packets lost during the transmission over the VoIP network. In the item of CODEC, the types of encoding and decoding with respect to audio data are recorded as set values. When reproducing communications via a plurality of communication networks, there may be a state where different types of encoding and decoding are used for the respective communication networks. The example shown in FIG. 3 indicates settings where encoding and decoding are performed n times for communications via a plurality of communication networks.

A plurality of communication state databases 13a shown as an example in FIG. 3 are recorded in association with each of the transmission directions and attributes of packets relayed by the relay device 1. The packet transmission directions include directions such as the transmission direction from the first communication device 3a to the second communication device 3b, and the transmission direction from the second communication device 3b to the first communication device 3a, or so-called up-direction and down-direction. The attributes of a packet show attributes such as the source device and destination device of the packet, the protocol and type of the packet. Regarding the devices, although the communication state database 13a is set for each of the communication devices 3 as the source device or the destination device, classifications such as the phone number and alias may also be taken into consideration. "For each protocol" means that the communication state database 13a is set for each SIP that is a control singling protocol, and each RTP/RTCP that is a streaming protocol. "For each packet type" means that the communication state database 13a is set for each session of audio, video, etc. specified by RTP that is a streaming protocol.

Figure 4:
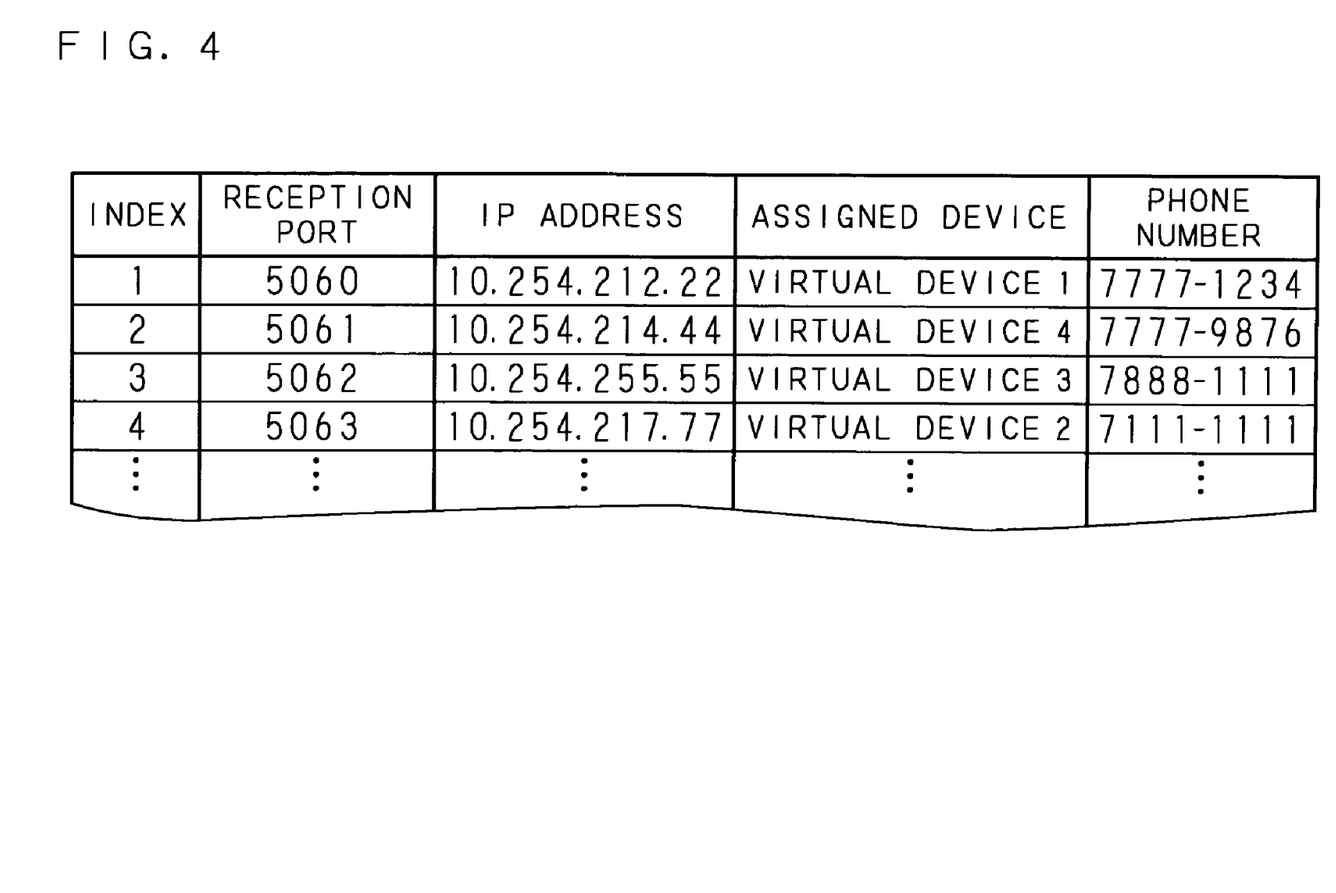
FIG. 4 is an explanatory view conceptually showing one example of recorded contents in a channel table included in the relay device of the present invention.

FIG. 4 is an explanatory view conceptually showing an example of the recorded contents in the channel table 14a included in the relay device 1 of the present invention. Recorded in the channel table 14a in association with an index is channel information, such as a reception port, the IP address of a communication device 3 which is to communicate with the port, an assigned device indicating a virtual device assigned for later described communication processing with this communication device 3, and the phone number of the communication device 3.

Figure 5:
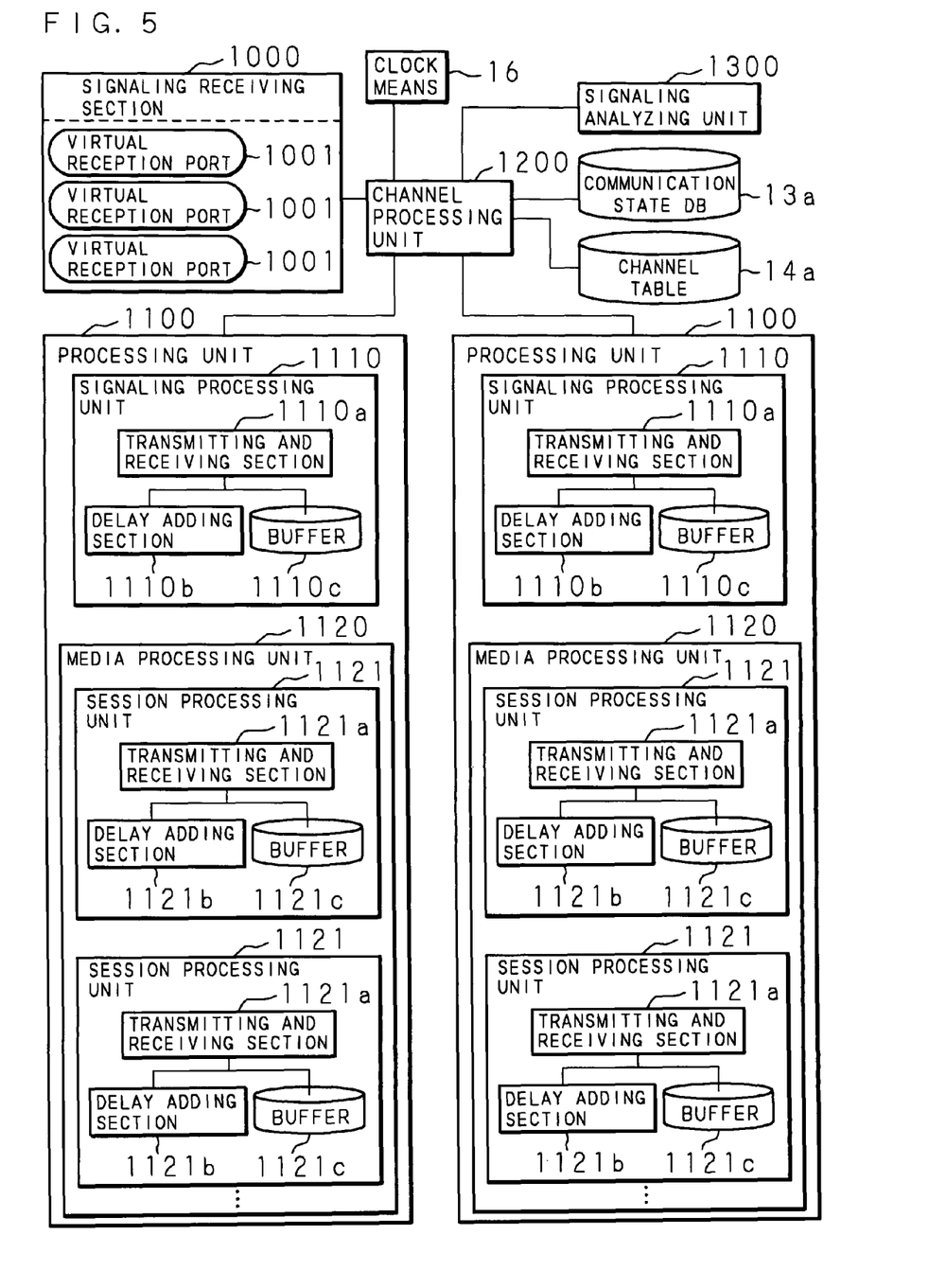
FIG. 5 is a functional block diagram showing conceptually the relationship between a structural example of a part of a program module developed by the relay device of the present invention and other structures.

Next, the following will explain the processes executed by the relay device 1 of the present invention. FIG. 5 is a functional block diagram showing conceptually the relationship between a structural example of a part of a program module developed by the relay device 1 of the present invention and other structures. In the relay device 1 of the present invention, when the computer program 200 is executed under the control of the control means 11, a virtual signaling receiving section 1000 for receiving a packet specified by a signaling protocol such as SIP, a plurality of virtual processing units 1100, 1100, . . . for processing packets based on the communication state information, a virtual channel processing unit 1200 for controlling a channel based on the channel table 14a, and a signaling analyzing unit 1300 for performing a process such as an analysis related to a packet specified by a signaling protocol are set on the recording means 13 and/or the storing means 14. A packet specified by a signaling protocol received by the signaling receiving section 1000 is a packet called INVITE of the SIP protocol which is transmitted first from the communication device 3 requesting the initiation of communication (hereinafter referred to as the INVITE packet), and channels and processing units 1100, 1100, . . . are set based on the INVITE packet in the relay device 1. Note that it may be possible to use a signaling protocol, such as H.323, other than SIP. When the signaling protocol is H.323, the packet which is to be received by the signaling receiving section 1000 is a packet called SETUP of H.225.

In the signaling receiving section 1000, a plurality of well-known ports for receiving INVITE packets are set corresponding to the communication devices 3, 3, . . . , respectively. In other words, a plurality of well-known ports are set as virtual reception ports 1001, 1001, . . . . In order to set a plurality of logical communication channels for communicating with a plurality of communication devices 3, 3, . . . through a single physical first communication line 101 which connects the relay device 1 and the connection device 2, a plurality of logical virtual reception ports 1001, 1001, . . . for receiving the INVITE packets from the respective communication devices are set. Note that this embodiment is explained based on an assumption that the communication state database 13a exemplified in FIG. 3 is set for each of the virtual reception ports 1001, 1001, . . . when a simulation is set for each of the up-direction and down-direction of packet transmission. It may also be possible to use only one virtual reception port 1001 and change the settings of simulations in the up-direction and the down-direction, according to classifications such as the destination device/source device phone number, and alias.

The processing units 1100, 1100, . . . correspond to the respective communication devices 3, 3, . . . involved in communications to be relayed, and each processing unit 1100 includes a signaling processing unit 1110 (processing unit) for performing a process related to a packet specified by a control protocol, such as a INVITE packet, and a media processing unit 1120 (processing unit) for performing a process related to a packet specified by a streaming protocol. Further, in the media processing unit 1120, session processing units 1121, 1121, . . . are set according to the types of streaming data, that is, sessions. An arbitrary number of session processing units 1121, 1121, . . . is set according to the types of streaming data to be relayed, and, when transmitting each audio and video by one session of RTP, for example, four session processing units 1121, 1121, 1121 and 1121 are set to control a total of four lines of sessions of audio RTP/RTCP and video RTP/RTCP. The signaling processing unit 1110 includes a transmitting and receiving section 1110a for performing a process related to the transmission and reception of a packet, a delay adding section 1110b for performing the process of adding a later-described delay time to a received packet, and a buffer 1110c for accumulating a packet. Similarly, each of the session processing units 1121, 1121, . . . included in the media processing unit 1120 comprises a transmitting and receiving section 1121a, a delay adding section 1121b, and a buffer 1121c.

The channel processing unit 1200 performs a process of selecting an appropriate destination of a received INVITE packet and setting a processing unit 1100, and a process of allocating the received INVITE packet to the set processing unit 1100. In other words, the channel processing unit 1200 performs a process of passing an INVITE packet received at the virtual reception port 1001 set in the signaling receiving section 1000 to a processing unit 1100 corresponding to the communication device 3 as the source device. Moreover, the channel processing unit 1200 manages and controls the overall processing by accessing the communication state database 13a and clock means 16 and delivering information to the signaling analyzing unit 1300.

Figure 6:
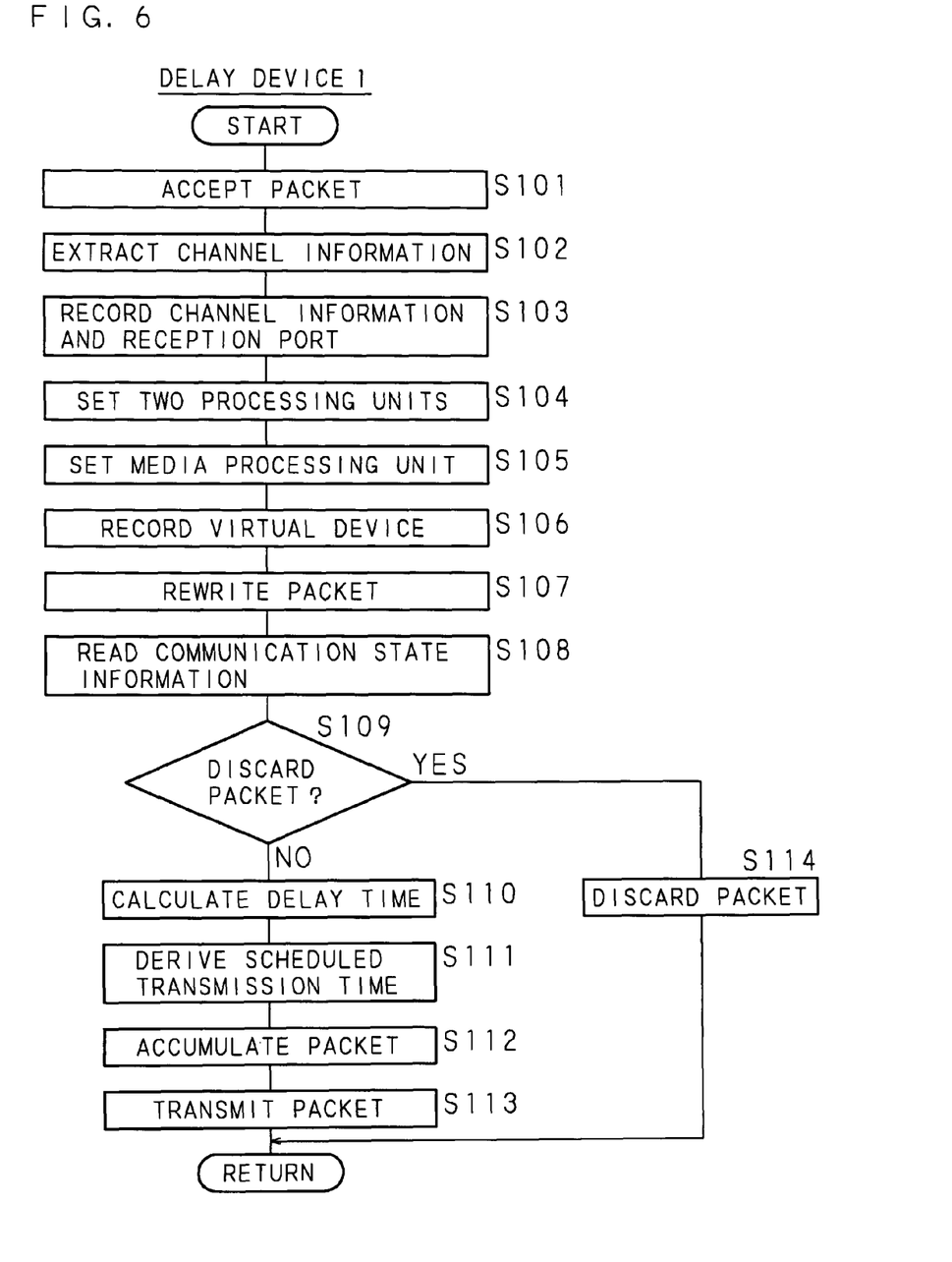
FIG. 6 is a flowchart showing a first communication initial process to be performed by the relay device of the present invention.

With the use of a program module developed on the recording means 13 and/or the storing means 14 shown in FIG. 5, the relay device 1 of the present invention performs a packet communication relay process. FIG. 6 is a flowchart showing a first communication initial process to be performed by the relay device 1 of the present invention. The first communication initial process is a process of setting a channel and a processing unit 1100, which is performed when an INVITE packet is received from a communication device 3 requesting the initiation of communication. First, the communication device 3 performs a calling process for transmitting an INVITE packet to the relay device 1 of the present invention, which is preset as an SIP proxy server for performing call setup. In the relay device 1, under the control of the control means 11 executing the computer program 200, the INVITE packet is received by the communication means 15 through the first communication line 101, and the received signaling packet is accepted by the virtual reception port 1001 set in the signaling receiving section 1000 (S101).

Under the control of the control means 11, the relay device 1 analyzes the signaling packet at the signaling analyzing unit 1300 and extracts the channel information such as the IP address and phone number related to the communication device 3 (first communication device 3a) on the sending end which transmitted the signaling packet (S102), and records the extracted channel information and a reception port indicating the virtual reception port 1001 which accepted the packet in the channel table 14a (S103).

Under the control of the control means 11, the relay device 1 sets two virtual processing units 1100 and 1100 including the signaling processing units 1110 corresponding to the first communication device 3a and the second communication device 3b, respectively (S104), further sets a media processing unit 1120 in the processing unit 1100 corresponding to the first communication device 3a, based on the contents of the INVITE packet (S105), records the set processing unit 1100 as a virtual device in the channel table 14a (S106), and rewrites the contents of the INVITE packet, according to the channel table 14a (S107). "Rewriting" mentioned in step S107 means the process of rewriting the channel information such as the IP address of the first communication device 3a indicated as the source device in the INVITE packet by the channel information such as the IP address of the relay device 1 and rewriting the channel information about the relay device 1 indicated as the destination device by the channel information about the second communication device 3b. Note that items in the channel table 14a related to the second communication device 3b as the destination device are manually set in advance. Of course, it may be possible to receive a REGISTER packet of SIP and set the items automatically. By performing rewriting shown in step S107, a packet including the contents related to a response to the INVITE packet transmitted to the second communication device 3b is transmitted from the second communication device 3b to the relay device 1 by the process described below. Note that in "Setting the media processing unit 1120" mentioned in step S105, a plurality of media processing units 1120 may be set for each media type.

Then, under the control of the control means 11, as a process performed by a delay adding section 1110b of the signaling processing unit 1110 corresponding to the first communication device 3a, the relay device 1 reads the communication state information containing the loss rate and the delay time distribution corresponding to a control packet to be transmitted from the first communication device 3a to the second communication device 3b together with the information on the channel table 14a from the communication state database 13a (S108), and determines, based on the loss rate contained in the read communication state information, whether or not to discard the signaling packet (S109).

In step S109, when a determination is made not to discard the signaling packet (S109: NO), under the control of the control means 11, the relay device 1 calculates a delay time based on the delay time distribution contained in the communication state information as the process performed by the delay adding section 1110b of the signaling processing unit 1110 corresponding to the first communication device 3a (S110), derives a scheduled transmission time of the signaling packet based on the calculated delay time and the time indicated by the clock means 16 (S111), and accumulates the signaling packet in association with the derived scheduled transmission time in the buffer 1110c of the signaling processing unit 1110 corresponding to the second communication device 3b as the destination device (S112). Then, under the control of the control means 11, the relay device 1 refers to the time indicated by the clock means 16, and, after reaching the transmission time associated with the signaling packet accumulated in the buffer 1110c of the signaling processing unit 1110 corresponding to the second communication device 3b, it transmits the accumulated signaling packet from the communication means 15 to the second communication device 3b through the first communication line 101 by a process performed in a transmitting and receiving section 1110a included in the signaling processing unit 1110 of the processing unit 1100 corresponding to the second communication device 3b (S113). In step S109, when a determination is made to discard the signaling packet (S109: YES), the signaling packet is discarded (S114), and the processing related to this packet is completed. Although it is possible to use various algorithms including already disclosed techniques for the processing, such as discarding of a packet and calculation of a delay time by the delay adding section 1110b, related to steps S108 to S114, the algorithm disclosed in the International Patent Application No. PCT/JP2004/19642 filed by the applicant of the present application is recommended here.

Figure 7:
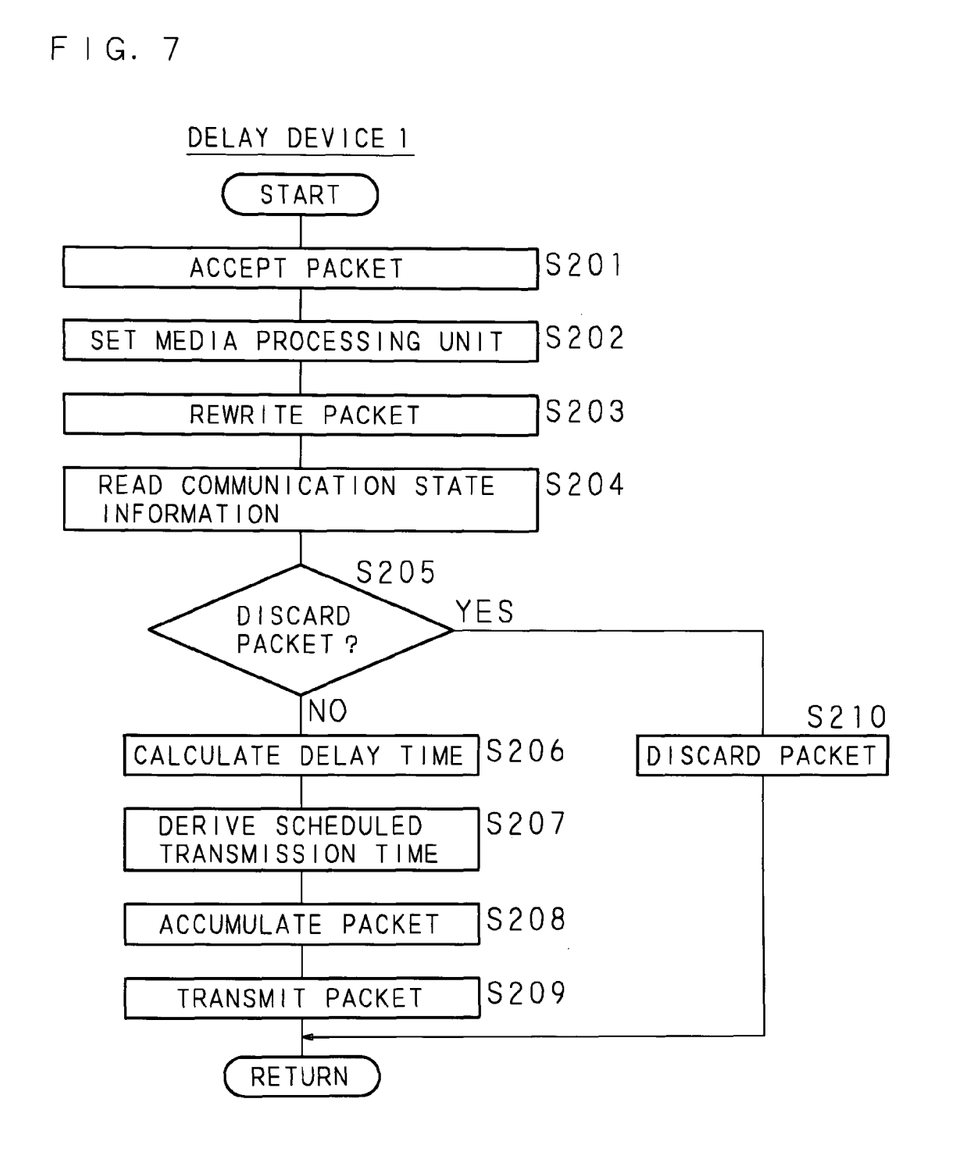
FIG. 7 is a flowchart showing a second communication initial process to be performed by the relay device of the present invention.

FIG. 7 is a flowchart showing a second communication initial process to be performed by the relay device 1 of the present invention. The second communication initial process is a process which is performed upon reception from the second communication device 3b a packet (hereinafter referred to as the response packet) including the contents related to a response to the INVITE packet transmitted to the second communication device 3b in the first communication process. Under the control of the control means 11 executing the computer program 200, the relay device 1 receives the response packet by the communication means 15 through the first communication line 101 and accepts it at the transmitting and receiving section 1110a included in the signaling processing unit 1110 of the processing unit 1100 corresponding to the second communication device 3b (S201).

Under the control of the control means 11, the relay device 1 sets a media processing unit 1120 in the processing unit 1100 corresponding to the second communication device 3b, based on the contents of the response packet (S202), and rewrites the contents of the response packet, according to the channel table 14a (S203). "Rewriting" mentioned in step S203 means the process of rewriting the channel information such as the IP address of the second communication device 3b indicated as the source device in the response packet by the channel information such as the IP address of the relay device 1 and rewriting the channel information about the relay device 1 indicated as the destination device by the channel information about the first communication device 3a. Note that in "Setting the media processing unit 1120" mentioned in step S202, a plurality of media processing units 1120 may be set for each media type.

Then, under the control of the control means 11, as a process performed by the delay adding section 1110b of the signaling processing unit 1110 corresponding to the second communication device 3b, the relay device 1 reads from the communication state database 13a the communication state information containing the loss rate and the delay time distribution corresponding to a control packet to be transmitted from the second communication device 3b to the first communication device 3a together with the information on the channel table 14a (S204), and determines, based on the loss rate contained in the read communication state information, whether or not to discard the response packet (S205).

In step S205, when a determination is made not to discard the response packet (S205: NO), under the control of the control means 11, the relay device 1 calculates a delay time based on the delay time distribution contained in the communication state information as the process performed by the delay adding section 1110b of the signaling processing unit 1110 corresponding to the second communication device 3b (S206), derives a scheduled transmission time of the response packet based on the calculated delay time and the time indicated by the clock means 16 (S207), and accumulates the response packet in association with the derived scheduled transmission time in the buffer 1110c of the signaling processing unit 1110 corresponding to the first communication device 3a as the destination device (S208). Then, under the control of the control means 11, the relay device 1 refers to the time indicated by the clock means 16, and, after reaching the transmission time associated with the response packet accumulated in the buffer 1110c of the signaling processing unit 1110 corresponding to the first communication device 3a, it transmits the accumulated response packet from the communication means 15 to the first communication device 3a through the first communication line 101 by a process performed by the transmitting and receiving section 1110a included in the signaling processing unit 1110 of the processing unit 1100 corresponding to the first communication device 3a (S209). In step S205, when a determination is made to discard the response packet (S205: YES), the response packet is discarded (S210), and the processing related to this packet is completed. Although it is possible to use various algorithms including already disclosed techniques for the processing related to steps S204 to S210, such as discarding of a packet and calculation of a delay time performed by the delay adding section 1110b, the algorithm disclosed in the International Patent Application No. PCT/JP2004/19642 filed by the applicant of the present application is recommended here. Further, if a response packet follows, the second communication initial process is repeated. However, the setup of the media processing unit 1120 in S202 is not necessary if it has been performed once. There is also a case where the communication devices 3 and 3 on the sending end and the receiving end are switched. Through the first communication initial process and second communication initial process described using FIGS. 6 and 7, a plurality of processing units 1100, signaling processing units 1110, media processing units 1120 or the like are set according to each of the attributes such as protocols and sessions and the transmission direction (source device). Moreover, through the first communication initial process and second communication initial process, the first communication device 3a and the second communication device 3b recognize that a call setup process for establishing communication channels has been completed.

Figure 8:
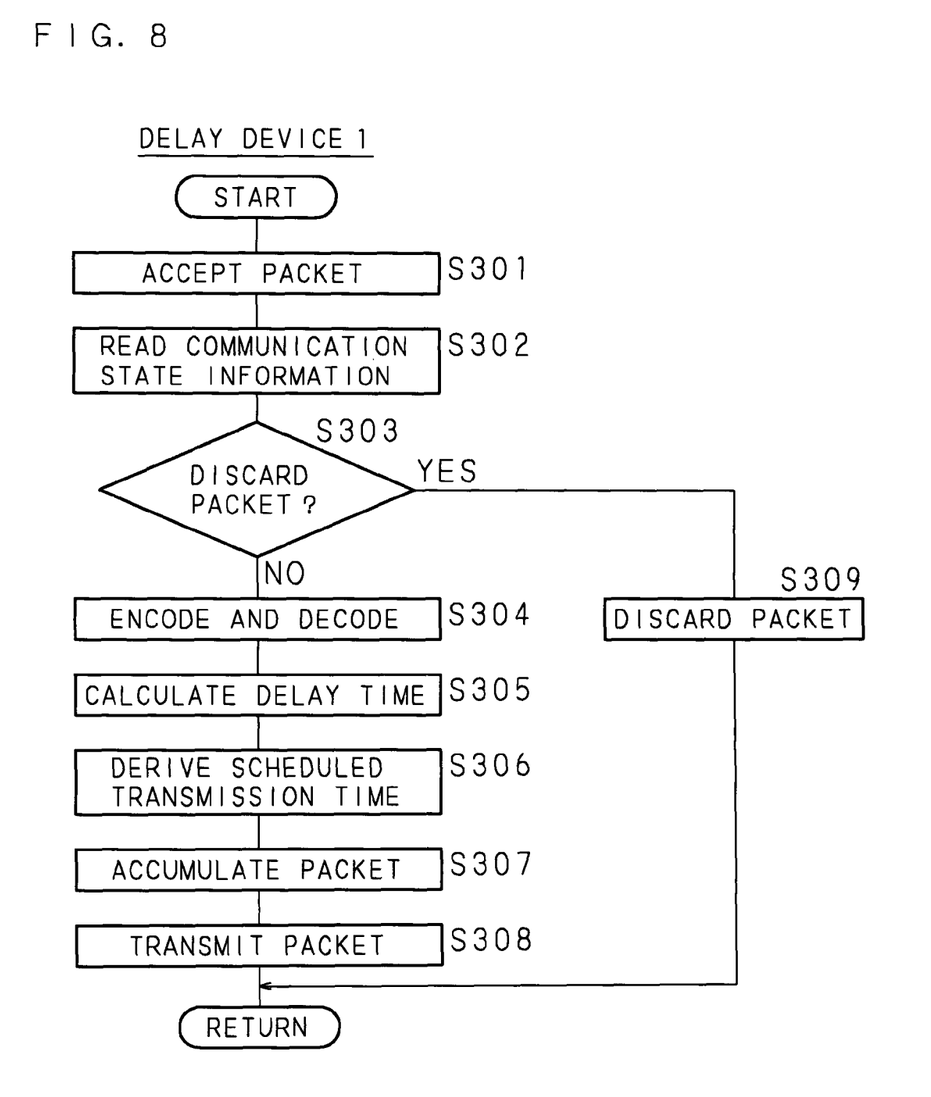
FIG. 8 is a flowchart showing a communication relay process to be performed by the relay device of the present invention.

FIG. 8 is a flowchart showing a communication relay process to be performed by the relay device 1 of the present invention. The communication relay process is the process of relaying streaming communication performed after establishing communication channels by the first communication initial process and second communication initial process. The first communication device 3a on the sending end transmits streaming communication packets (hereinafter referred to as the media packets) containing media information, such as audio and video specified by a protocol such as RTP and RTCP, as streaming data of payload to the relay device 1 to forward the packets to the second communication device 3b. Under the control of the control means 11 executing the computer program 200, the relay device 1 receives the media packets by the communication means 15 through the first communication line 101, and accepts the received media packets at the transmitting and receiving section 1121a included in the media processing unit 1120 of the processing unit 1100 corresponding to the first communication device 3*a* and also corresponding to the type of streaming data to be relayed (S301).

Under the control of the control means 11, as a process performed by the delay adding section 1121*b* of a media processing unit 1120 corresponding to the first communication device 3*a* and the type of streaming data contained in the received media packet, the relay device 1 reads from the communication state database 13*a* the communication state information containing the packet transmission direction from the first communication device 3*a* to the second communication device 3*b*, the loss rate and the delay time distribution corresponding to attributes such as the protocol and type together with the information on the channel table 14*a* (S302), and determines, based on the loss rate contained in the read communication state information, whether or not to discard the media packet (S303). In step S303, when a determination is made not to discard the media packet (S303: NO), the relay device 1 performs an encoding and decoding process once or a plurality of times on the media packet, under the control of the control means 11 (S304). The encoding and decoding process performed in step S304 is the process of reproducing CODEC which is performed when performing communication over an actual communication network. Therefore, if a communication network to be used for supposed communication is established with a plurality of communication networks and encoding and decoding are performed many times during transmission over the respective communication networks, a plurality of times of encoding and decoding are performed according to processing methods (algorithms) defined for the respective communication networks. Note that the conditions of encoding and decoding, namely processing methods performed as individual encoding and decoding processes, are determined with reference to the set values of CODEC recorded in the channel table 14*a*.

Under the control of the control means 11, as a process performed by the delay adding section 1121*b* of the media processing unit 1120 corresponding to the first communication device 3*a*, the relay device 1 calculates a delay time based on the delay time distribution contained in the communication state information (S305), derives a scheduled transmission time of the media packet based on the calculated delay time and the time indicated by the clock means 16 (S306), and accumulates the media packet in association with the derived scheduled transmission time in the buffer 1121*c* of the media processing unit 1120 corresponding to the first communication device 3*a* (S307).

Figure 9:
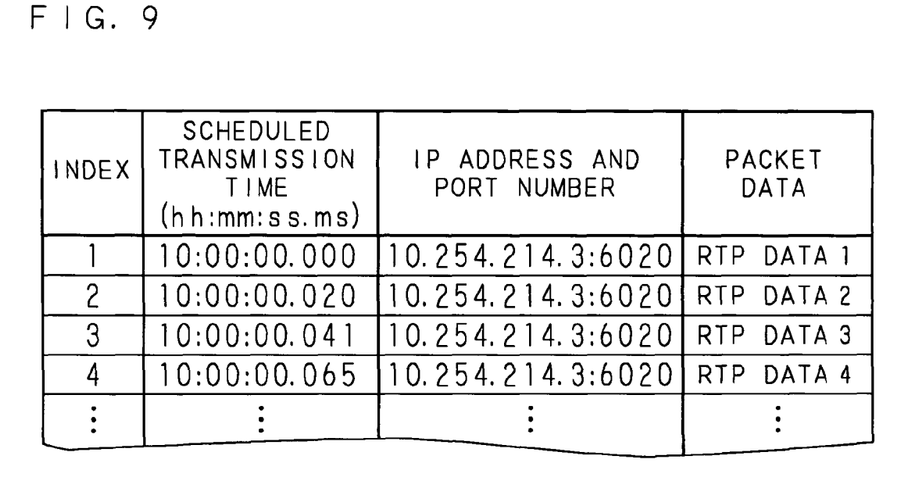
FIG. 9 is an explanatory view conceptually showing an example of packets accumulated in a buffer set in the relay device of the present invention.

FIG. 9 is an explanatory view conceptually showing an example of packets accumulated in the buffer 1121*c* set in the relay device 1 of the present invention. In the buffer 1121*c*, the scheduled transmission time, the IP address and port number of the communication device 3 as the destination device, and packet data of each packet are recorded in association with an index. The scheduled transmission time is the packet transmission time derived by the relay device 1 based on the communication state information. Regarding the packet data, as the information indicated in the data section of each packet, the present invention may include information such as audio data for reproducing voice. Note that the above-mentioned signaling packet and RTCP packet are also accumulated in the same manner.

Returning to the flowchart of FIG. 8, under the control of the control means 11, the relay device 1 refers to the time indicated by the clock means 16, and, after reaching the transmission time associated with the media packet accumulated in the buffer 1121*c* of the media processing unit 1120 corresponding to the first communication device 3*a*, it transmits the accumulated media packet from the communication means 15 to the second communication device 3*b* through the first communication line 101 by the process performed in the transmitting and receiving section 1121*a* included in the media processing unit 1120 of the processing unit 1100 corresponding to the first communication device 3*a* (S308). In step S303, when a determination is made to discard the media packet (S303: YES), the media packet is discarded (S309), and the processing related to this packet is completed. Although it is possible to use various algorithms including already disclosed techniques for the processing related to steps S303 to S309 such as discarding of a packet and calculation of a delay time performed by the delay adding section 1121*b*, the algorithm disclosed in the International Patent Application No. PCT/JP2004/19642 filed by the applicant of the present application is recommended here.

As explained using FIG. 8, since the media packet is transmitted in one direction without requiring a response, there is no need to perform the process of rewriting the contents of a packet, which is performed for the signaling packet and the response packet. Moreover, there is such a difference that the signaling packet and the response packet are accumulated in the buffer 1110*c* of the signaling processing unit 1110 included in the processing unit 1100 corresponding to the second communication device 3*b* as the destination device (or the first communication device 3*a* for the response packet), but the media packet is accumulated in the buffer 1121*c* of the media processing unit 1121 included in the processing unit 1100 corresponding to the first communication device 3*a* as the source device.

Through the above-described processes, the relay device 1 transmits the media packets to the second communication device 3*b* based on the transmission times, and a subject who operates the second communication device 3*b* audits the voice outputted from the second communication device 3*b* based on the received media packets. The quality of the outputted voice is the quality of communication reproducing the state of communication over the communication network through which the media packets pass, based on the information recorded in the communication state database 13*a*.

Although the above-described embodiment illustrates a mode for evaluating communication quality by reproducing the state of communication over the VoIP network used as IP phones, the present invention is not limited to this and may be developed in various modes, such as for use in evaluating the communication quality related to television video streaming. Moreover, it is apparent that the transmission and receiving directions between the first communication device and the second communication device may be switched, or bilateral communication may be performed.

Further, although the above-described embodiment illustrates a mode for relaying communication between one set of communication devices, namely the first communication device and second communication device, the present invention is not limited to this and may relay communications between two or more sets of communication devices.

The invention claimed is:

1. A relay method for transmitting a packet received from one communication device to other communication device, said relay method comprising:
  deriving a transmission time of a received packet based on prerecorded communication state information indicating a communication state, by a virtual processing unit corresponding to a packet transmission direction and/or attribute; and transmitting the packet based on the derived time, by the virtual processing unit,
the communication state information containing information indicating a packet loss rate, and
wherein said virtual processing unit discards a packet based on the loss rate contained in the communication state information.

2. A relay device for transmitting a packet received from one communication device to other communication device, comprising
a processing unit corresponding to a packet transmission direction and/or attribute, for deriving a transmission time of a packet based on prerecorded communication state information indicating a communication state, and transmitting the packet based on the derived time,
the communication state information containing information indicating a packet loss rate, and
wherein said processing unit discards a packet based on the loss rate contained in the communication state information.

3. A communication system comprising:
a relay device defined in claim 2; and
a plurality of communication devices for communicating with each other through said relay device.

4. A relay device for transmitting a packet received from one communication device to other communication device, comprising
a controller setting a virtual processing unit corresponding to a packet transmission direction, said virtual processing unit deriving a transmission time of a packet based on prerecorded communication state information indicating a communication state, and transmitting the packet based on the derived time,
the communication state information containing information indicating a packet loss rate, and
wherein said virtual processing unit discards a packet based on the loss rate contained in the communication state information.

5. The relay device as set forth in claim 4, wherein the communication state information is recorded in association with the processing unit.

6. The relay device as set forth in claim 4,
wherein the packet is a control packet specified by a control protocol, and
wherein said controller is further capable of setting a virtual signaling processing unit for processing the control packet, in the processing unit.

7. The relay device as set forth in claim 4,
wherein the packet is a streaming communication packet specified by a streaming protocol, and
wherein said controller is further capable offsetting a virtual media processing unit for processing the streaming communication packet, in the processing unit.

8. The relay device as set forth in claim 4, wherein said controller is further programmed for setting a plurality of logical communication ports corresponding to a plurality of logical communication channels, respectively, through a single physical communication line, and
wherein the communication channels correspond to the plurality of processing units, respectively.

9. The relay device as set forth in claim 4, wherein said processing unit performs encoding and decoding data contained in a received packet.

10. A communication system comprising:
a relay device defined in claim 4; and
a plurality of communication devices for communicating with each other through said relay device.

11. A relay device for transmitting a packet received from one communication device to other communication device, comprising
a first setting unit which sets a virtual processing unit corresponding to a packet transmission direction,
said virtual processing unit deriving a transmission time of a packet based on prerecorded communication state information indicating a communication state and transmits the packet based on the derived time,
the communication state information containing information indicating a packet loss rate,
wherein said virtual processing unit comprises
a discarding unit which discards a packet based on the loss rate contained in the communication state information.

12. The relay device as set forth in claim 11, wherein the communication state information is recorded in association with the processing unit.

13. The relay device as set forth in claim 11,
wherein the packet is a control packet specified by a control protocol, and
wherein said first setting unit sets a virtual signaling processing unit for processing the control packet, in the processing unit.

14. The relay device as set forth in claim 11,
wherein the packet is a streaming communication packet specified by a streaming protocol, and
wherein said first setting unit sets a virtual media processing unit for processing the streaming communication packet, in the processing unit.

15. The relay device as set forth in claim 11, further comprising a second setting unit which sets a plurality of logical communication ports corresponding to a plurality of logical communication channels, respectively, through a single physical communication line, and
wherein the communication channels correspond to the plurality of processing units, respectively.

16. The relay device as set forth in claim 11, wherein said processing unit further comprises an encoding and decoding unit which encodes and decodes data contained in a received packet.

17. A communication system comprising:
a relay device defined in claim 11; and
a plurality of communication devices for communicating with each other through said relay device.

18. A computer-readable recording medium storing program therein for causing a computer to perform an operation, comprising:
communicating with a plurality of devices to transmit a packet received from one device to other device;
setting a virtual processing unit, which derives a transmission time of a packet based on prerecorded communication state information indicating a communication state and a packet loss rate, and transmits the packet based on the derived time, in association with a packet transmission direction and/or attribute, and
discarding a packet based on the loss rate contained in the communication state information.

* * * * *